Feb. 8, 1955  A. J. CLAUSEN  2,701,729
ARTICULATED VEHICLE FOR PULL-TYPE SPREADER
Filed July 2, 1951
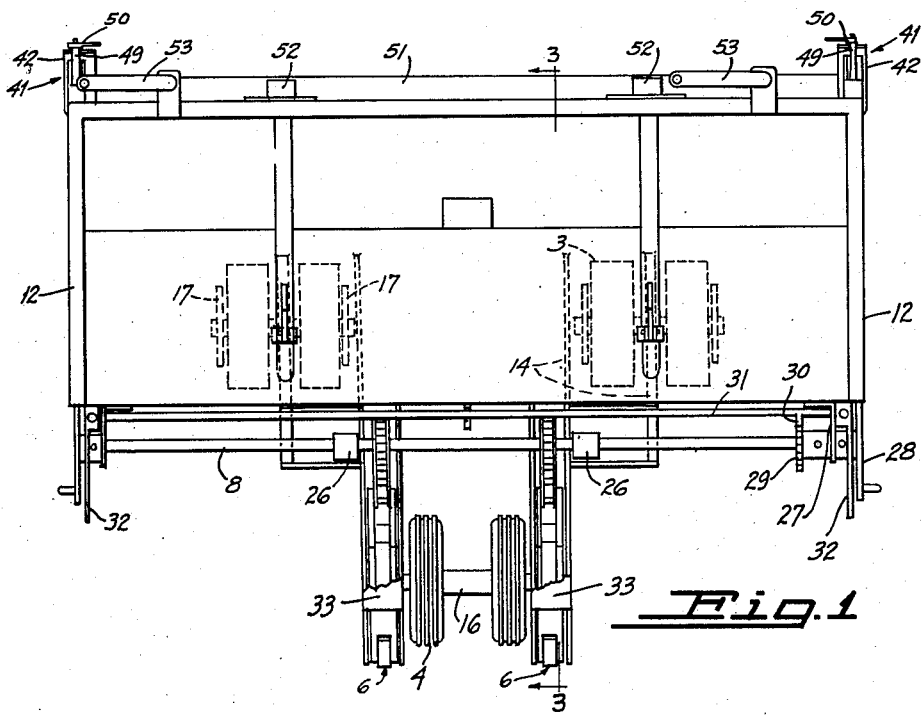
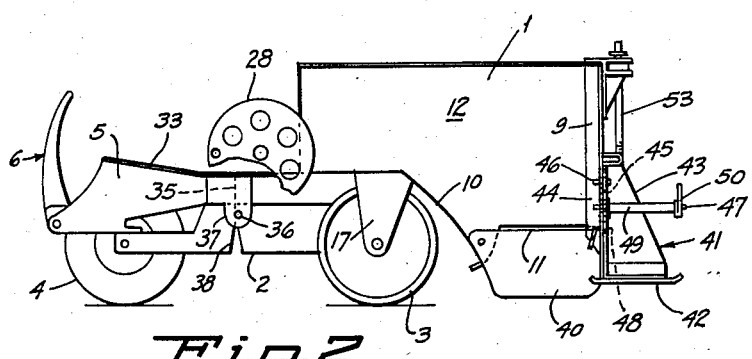
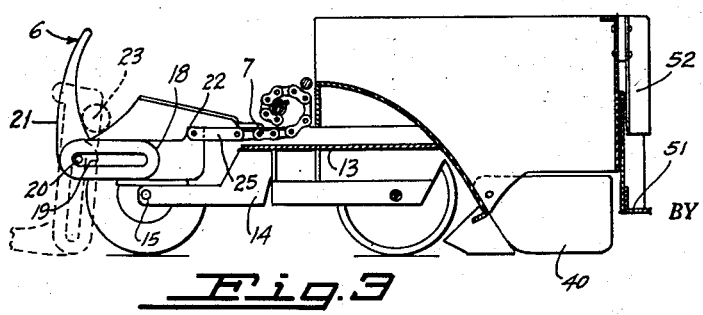
INVENTOR.
Andrew J. Clausen
BY
ATTORNEY

United States Patent Office 2,701,729
Patented Feb. 8, 1955

2,701,729

ARTICULATED VEHICLE FOR PULL-TYPE SPREADER

Andrew J. Clausen, Berkeley, Calif.

Application July 2, 1951, Serial No. 234,825

4 Claims. (Cl. 280—400)

The present invention relates to improvements in a pull-type spreader used in road construction for evenly spreading a load of road material, such as crushed rock, crushed gravel, asphaltic material and the like upon a finished road-bed. This application is a continuation in part of my co-pending application Serial Number 144,818 filed on February 17, 1950.

Spreaders of this type usually comprise a hopper or spreader box adapted for attachment to a dump truck and for being pulled over the roadbed by the latter while a charge is dumped into the box from the truck, the box being arranged to deliver the charge upon the roadbed in an even layer.

One of the principal objects of my invention is to provide an attachment carried by the spreader whereby the latter may be conveniently secured to the rear axle of the dump truck regardless of the height of the axle above the roadbed and without requiring any chains or any special brackets or equipment carried by the dump truck.

A further object of the invention is to provide a convenient manipulating means for the attachment, allowing the rear axle of the dump truck to be backed up against a part of the attachment, to be firmly anchored thereto by operation of a hand wheel, and to be quickly released by operation of a releasing means.

A still further object of the invention is to provide a four-wheel support for the spreader assembly, including the box and the attachment, the four-wheel support serving to distribute the material evenly and level at all times regardless of grade conditions and to place the attachment in proper position with respect to the rear axle of the dump truck.

Further objects and advantages of my invention will appear as the specification proceeds, and the novel features of my invention will be fully defined in the claims attached hereto.

The preferred form of my invention is illustrated in the accompanying drawing, in which Figure 1 shows a plan view of my pull-type spreader,
Figure 2, a side view of the same, and
Figure 3, a section taken along line 3—3 of Figure 1.

While I have shown only the preferred form of my invention, I wish to have it understood that various changes and modifications may be made within the scope of the claims attached hereto without departing from the spirit of the invention.

Referring to the drawing in detail, my pull-type spreader comprises in its general features a conventional hopper 1, a pair of frame members 2 projecting forwardly therefrom, a pair of rear wheels 3 supporting the rear ends of the frame members, a second pair of wheels 4 supporting the front ends of the frame members, a pair of shoes 5 mounted upon the front ends of the frame members, a hook 6 pivoted in the front ends of the shoes, a pair of chains 7 operating the hooks and a revolvable rod 8 for operating the chains.

The hopper 1 is in the form of a wide box having a straight rear wall 9, a curved front wall 10 forming a bottom opening 11 with the rear wall, and parallel side walls 12.

The two frame members 2 project forwardly from the curved front wall and are rigidly secured thereto. Each comprises an upper channel 13 and a deep flange 14 depending therefrom. The forward ends of the flanges serve as bearings 15 for the axle 16 of the front wheels 4 which are located between the frame members. The rear ends of the frame members are supported by the rear wheels 3 which are arranged outside the frame members and take bearing in the flanges 14 of the frame members as well as in brackets 17 depending from the curved front wall of the hopper.

At the front the walls of the channels 13 of the frame members 2 are enlarged to form spaced pairs of shoes 5 which have forwardly presented, inclined edges approximately at the height of the rear axle of a dump truck so that when the truck is backed up against the spreader, the rear axle of the truck will come up against the front edges of the shoes, the edges being sufficiently long to compensate for any differences in height in different trucks.

The hooks 6 are intended to cooperate with the shoes in tightly clamping the rear axle of the dump truck upon the shoes. Each of the hooks comprises a straight shank 18 having a straight slot 19 therein, the walls of which are adapted to ride on a pin 20 mounted in the lower forward end of each shoe, a claw 21 at one end adapted for engagement over the rear axle from in front, and a short spur 22 projecting from the opposite end of the shank in the same direction as the claw.

When the hook is positioned as shown in full lines in Figures 2 and 3, with the pin 20 in the extreme end of the slot and the shank in horizontal position, the claw bears upon the front of the rear axle (shown at 23) and holds the same firmly to its shoe. When the hook is allowed to fall back, with the claw in substantially horizontal position and the shank in vertical position and the pin in the opposite end of the slot (as shown in dotted lines), the claw clears the dump truck axle and the dump truck is free to move away from the spreader.

The hooks are operated for tightening upon the rear axle by means of chains 7. One end of each chain is attached to the spur 22, through a link 25, and the other end of each chain is attached to the rod 8 mounted forwardly of the hopper and being substantially coextensive in length to the width of the hopper. The rod is revolvably mounted in bearings 26 secured upon the channels 13 and, at its ends, in brackets 27 projecting from the front wall of the hopper. It may be manipulated from either side of the hopper by means of either of the hand wheels 28 secured upon opposite ends of the rod.

The rod also carries a ratchet wheel 29 cooperable with a pawl 30 in holding the rod against reverse rotation. The pawl is carried by a second rod 31 revolvable in the brackets 27 and operable by either one of two handles 32 for releasing the pawl and ratchet engagement.

The chains run in the two channels 13 and between the shoes of each pair and the latter are interconnected, above the chains, by guards 33 which keep the chains from rising above the channels provided for them when the chains are tightened by the pulling action of the rod.

To improve the operating characteristics of my spreader, I preferably split the two frame members 2 substantially midway of their lengths, as at 35, the two sections thus formed in each frame member being joined by a hinge pin 36 extending through registering lips 37 depending from the channels at the joint. The split above the hinge pin is along a vertical line, as shown, so that the channel sections abut when the two frame sections are in horizontal alinement and prevent upward swinging movement of the front section beyond horizontal alinement. Below the hinge pin 36 the split is V-shaped as at 38, expanding downwardly, so as to allow of a slight downward swing of the front section of each frame member. This allows the front wheels to pass through a slight depression in the road-bed, say of about two or three inches, without any lifting effect on the rear end of the hopper.

The hopper is provided with suitable conventional side guards 40 and control means for raising and lowering the hopper and means for evenly spreading the layer of material on the road-bed.

The control means comprises a pair of skids 41 mounted on opposite sides of the hopper. Each skid is in the form of a bracket having a horizontal member 42 adapted to ride on the road surface and a vertical member 43 adapted for fastening upon a vertical flange 44 projecting from the hopper. The flange is formed with a series of holes 45 and the vertical member has a pin 46 projecting forwardly therefrom for engagement in any selected one of the holes. The flange has a bolt 47 projecting rearwardly therefrom to pass through a vertical slot 48 in the vertical member, and the bolt carries a spacing sleeve 49 which may be forced upon the vertical member, for locking the same upon the flange in adjusted position, by means of a nut 50 threaded upon the outer end of the bolt.

The means for spreading the material consists of a horizontal striker plate 51 mounted rearwardly of the hopper in spaced relation to the road surface. This plate is guided in vertical guides 52 and may be adjusted for raising and lowering by conventional screws 53.

In operation, the hooks 6 will normally assume the position shown in dotted lines in Figure 3, under their own weight or with slight assistance on the part of the operator. To attach the spreader to the dump truck, the latter is backed up against the spreader until the rear axle of the dump truck contacts the shoes 5. The operator then turns either of the hand wheels 28 to wind the chains 7 upon the rod 8. During this operation the chains will first turn the hooks upon their pivots 20 until the shanks of the hooks reach an approximately horizontal position, which will cause the claws 21 to rise in front of the rear axle. Upon continuation of the chain winding movement the hooks will be retracted, with the walls of the slot 19 riding on the pin 20 until the claws of the hooks firmly engage upon the rear axle of the dump truck and confine the axle in the crotch formed between the claws and the shoes.

During the winding operation the pawl and ratchet 29—30 automatically lock the rod 8 against reverse rotation whenever the operator ceases winding.

After the load of the dump truck has been discharged into the hopper, the dump truck may be released by operation of the handles 32, which moves the pawl 30 away from the ratchet 29 and allows the hooks to fall back into the dotted line position, either under their own weight or in response to a forward movement of the dump truck.

I claim:

1. In a pull-type spreader, a main frame having a rear section and a front section, with a hopper fixedly supported on the rear section, a pair of spaced wheels supporting the forward part of the rear section and detached from the front section, a pair of additional spaced supporting members for the rear of the hopper, a pivotal connection between the rear end of the front section and the front end of the rear section, means for normally supporting the front section at the elevation of the rear section, and stop members on the front and rear sections to prevent the front section from swinging upward on the pivotal connection above the elevation of the rear section, the pivotal connection allowing the front section to dip without causing the hopper to swing upward on the axis of the wheels.

2. A pull-type spreader as defined in claim 1, in which the supporting means for the front section comprises a pair of wheels spaced transversely less than the spacing between the wheels supporting the rear section.

3. In a pull-type spreader, a main frame having a rear section and a front section, with a hopper fixedly supported on the rear section, a pair of spaced wheels supporting the forward part of the rear section and detached from the front section, a pair of additional spaced supporting members for the rear of the hopper, a pivotal connection between the rear end of the front section and the front end of the rear section, means for normally supporting the front section at the elevation of the rear section, stop members on the front and rear sections to prevent the front section from swinging upward on the pivotal connection above the elevation of the rear section, and cooperating shoes and hooks at the front end of the front section for coupling the same to the rear axle of a dump truck, the shoes and hooks, when in engagement with the axle, being made to form an upwardly opening crotch subject to the downward pressure of the axle, but allowing the axle to rise therein, and the pivotal connection allowing the front section to swing downward under the weight of the rear axle without causing the hopper to swing upward on the axis of the wheels.

4. A pull-type spreader as defined in claim 3, in which the supporting means for the front section comprises a pair of wheels spaced transversely less than the spacing between the wheels supporting the rear section.

References Cited in the file of this patent

UNITED STATES PATENTS

| | | |
|---|---|---|
| 1,288,432 | Long | Dec. 17, 1918 |
| 2,050,518 | Baumgardner | Aug. 11, 1936 |
| 2,193,155 | Antoine | Mar. 12, 1940 |
| 2,403,820 | Miller | July 9, 1946 |

FOREIGN PATENTS

| | | |
|---|---|---|
| 325,245 | Italy | Mar. 6, 1935 |